United States Patent [19]

Akasaka et al.

[11] Patent Number: 4,965,080

[45] Date of Patent: Oct. 23, 1990

[54] PROCESS FOR PRODUCING TOFU-LIKE FOOD

[75] Inventors: Takeshi Akasaka, Osaka; Kumie Ochi; Kazuhiro Onari; Tsutomu Katayama, both of Hyogo; Hitoshi Furuta; Kazumi Nakae, both of Osaka; Satomi Fukuda, Hyogo, all of Japan

[73] Assignee: Fuji Oil Company Limited, Osaka, Japan

[21] Appl. No.: 304,098

[22] Filed: Jan. 31, 1989

[51] Int. Cl.$^5$ .......................... A23L 1/052; A23L 1/20
[52] U.S. Cl. .................................... 426/104; 426/573; 426/574; 426/656; 426/657; 426/634
[58] Field of Search .............. 426/573, 656, 657, 574, 426/104, 634

[56] References Cited

U.S. PATENT DOCUMENTS

| 4,391,835 | 7/1983 | Katayama | 426/573 |
| 4,664,930 | 5/1987 | Moriya | 426/573 |
| 4,789,556 | 12/1988 | Okonogi | 426/573 |
| 4,816,266 | 3/1989 | Rowat | 426/573 |

FOREIGN PATENT DOCUMENTS

| 57-23029 | 6/1972 | Japan | 426/573 |
| 0002945 | 1/1980 | Japan | 426/573 |
| 2115253 | 5/1987 | Japan | 426/573 |
| 3014668 | 1/1988 | Japan | 426/573 |

Primary Examiner—Jeanette Hunter
Attorney, Agent, or Firm—Sughrue, Mion, Zinn, Macpeak & Seas

[57] ABSTRACT

A process for producing tofu-like food is disclosed, which comprises preparing a mixture containing soybean curd, soybean protein, water, and fats and oils and coagulating the mixture by heating. The resulting tofu-like food has physical properties suitable for cooking in a large quantity as well as pleasant taste and palatability.

9 Claims, No Drawings

PROCESS FOR PRODUCING TOFU-LIKE FOOD

FIELD OF THE INVENTION

This invention relates to a process for producing tofu (a kind of traditional soybean product in the Orient, especially in Japan)-like food, and more particularly to a process for producing tofu-like food having physical properties suitable for processing and cooking in large quantities while retaining pleasant taste and palatability.

BACKGROUND OF THE INVENTION

Much information concerning tofu dishes are now presented, for example, in a home cooking column of Japanese papers and cook books, and tofu dishes are becoming widely popular both in homes and restaurants.

It is not so easy, however, to handle a large quantity of tofu in processing or cooking because of its fragility. For example, in the preparation of a Chinese dish, Mabo-Dofu, there are involved cutting of tofu into dice and mixing the cut pieces with condiments and thickening the seasoned soup with dogtooth violet starch. As long as tofu is handled in a small quantity and with care as in home cooking, it is not impossible to cut or mix tofu without damage or crumbling. However, tofu should suffer from crumbling to a serious extent when handled in bulk unless a specially designed apparatus is developed.

In preparing a tofu salad by mixing cut pieces of tofu and vegetables with a dressing, tofu would be similarly crumbled during mixing. In addition, the water is released from tofu when left to stand for a while to make the dressing watery and less palatable. It is therefore difficult to make large quantities of tofu salad dishes and keep them in stock.

Tofu is generally prepared through processing steps of immersion of soybeans in water, grinding to a soybean juice, heating, separation into a soymilk and an okara (residue), and coagulation of the protein by addition of a coagulant to obtain bean curd.

On the other hand, a process for easily preparing a tofu-like gel without requiring the above-described coagulation step has been proposed as described in JP-A49-7453 (the term "JP-A" as used herein means an "unexamined published Japanese patent application"), in which a tofu-like gel is obtained directly from a homogenized mixture comprising soybean protein (particularly isolated soybean protein) and water, and preferably fats and oils. The technique has undergone developments through proposals on the production of frozen tofu, dried tofu or the like foods as disclosed in JP-A-54-122755 and 58-78560. However, the tofu-like products as produced by this technique are available only in hermetically sealed packages, where the mixture of raw materials has been solidified; or the dried tofu products are utilized only as an ingredient of soups. Hence, these products are still unsatisfactory from considerations for applicability to large quantity cooking.

Although the development of freezing of tofu has succeeded in prevention of denaturation due to freezing, it has not yet achieved satisfactory restoration in original softness after thawing.

The inventors of the present invention noted that the above-described gel prepared from a homogeneous mixture of soybean protein, water, and fats and oils (hereinafter referred to as "tofu-like food"), as compared with conventional tofu, is less crumbly, and its water content is hardly released therefrom with time so that dressings or seasoned soups can be prevented from becoming watery. The inventors considered the tofu-like food promising for processing and seasoning in a large quanity because of these merits. In turn, the tofu-like food differs from conventinal tofu in mouth-feel, rather feeling like sesami tofu (a gel prepared from sesami and arrowroot starch), and is somewhat wanting in the good taste of tofu. Hence, it has been demanded to overcome such delicate differences of the tofu-like foods from tofu for particular use in tofu dishes in which tofu (or tofu-like food) plays a chief role, such as Mabo-Dofu, setting aside the case where the tofu-like food is used as an ingredient of soups.

SUMMARY OF THE INVENTION

Accordingly, one object of this invention is to provide a process for producing tofu-like food which is very close to the conventional tofu in palatability and, taste while retaining the advantages of being less crumbly and hardly releasing its water content.

Another object of this invention is to provide a process for producing tofu-like food which retains the softness characteristic of tofu even when frozen and thawed.

As a result of extensive investigations, it has now been found that the above objects of this invention can be accomplished by using an appropriate amount of soybean curd in combination with soybean protein and, if desired, controlling the pH of the mixture of raw materials within a specific range. It has also been found that incorporation of a hydrous gel of polysaccharides into the mixture of raw materials is effective to improve tofu-like softness of a frozen product after thawing.

That is, the present invention relates to a process for producing tofu-like food which comprises preparing a mixture comprising soybean curd, soybean protein, water, and fats and oils and coagulating the mixture by heating.

DETAILED DESCRIPTION OF THE INVENTION

The soybean curd which can be used in the present invention is not particularly limited in process of production as long as it is obtained by the reaction between soybean protein and a coagulant. Such soybean curd includes not only the conventional tofu products, such as silken tofu (called "kinugoshi tofu" in Japan), ordinary tofu (called "momen tofu" in Japan) which is rougher and less crumbly than silken tofu, and hard tofu or "kata-dofu" in Japan (a kind of momen-tofu for fried tofu), which are generally prepared by a process comprising immersing soybeans in water, grinding to obtain a soybean juice, heating, separation into a soymilk and a okara (residue), and adding a coagulant to the dispersion to curdle the soybean protein; but also soybean curds obtained by adding a coagulant to a homogenized mixture of isolated soybean protein, fats and oils, and water.

The coagulant to be added may be any of alkaline earth metal salts (e.g., bittern, calcium chloride, calcium sulfate, magnesium chloride, etc.) or δ-gluconic lactone. In order to ensure the effects to improve physical properties and taste of the products, it is preferable to use soybean curds obtained by adding an alkaline earth metal type coagulant and discharging "yu" (tofu-whey).

The soybean protein which can be used in the present invention should be soybean protein which has not undergone heating at a temperature of several tens of degrees C in the presence of a coagulant and includes extracted soybean protein, concentrated soybean protein, and isolated soybean protein. In view of taste and physical properties of products, preferred are those comprising isolated soybean protein as a main component.

Addition of the soybean protein before formation of soybean curd produces some effect to improve shaperetention properties of tofu products, but slightly weakens the effect to prevent water release and also undergoes denaturation due to freezing. Therefore, it is required in this invention to separately use the soybean protein as an individual component apart from soybean curd.

The soybean curd is preferably used in such an amount that the ratio of crude protein (CP) in the soybean curd to that of soybean protein (hereinafter referred to as CP ratio) is at least 5% by weight. If the amount of the soybean curd is too small, the effects to reduce the taste characteristic of heat-gelled soybean protein and to impart the good taste would be insufficient. With CP ratios ranging from 5 to 100% by weight, crumbling and water release with time can be prevented. However, in cases when the resulting tofu-like product is frozen, if the CP ratio is 60% by weight or higher, freezing resistance would be considerably reduced. Such being the case, addition of additives for increasing freezing resistance, such as starch and polysaccharides, cannot achieve the expected effect, and eventually tofu-like palatability would be reduced. Thus, when a freezing step is included in the production or processing of tofu-like food, the most preferred CP ratio ranges from about 10 to 40% by weight.

The ratio of water to the soybean protein varies depending on the degree of dehydration of the tofu curd, amounts of other water-absorbing additives arbitrarily added (e.g., starch), and the like. In general, the water content in the mixture before coagulation (exclusive of a water content of a hydrous gel of a polysaccharide, if used as hereinafter described) usually ranges from 65 to 80% by weight, preferably from 70 to 75% by weight.

The fats and oils are usually used in an amount of from about 0.5 to 3 times the weight of the soybean protein.

The fats and oils which can be used in the present invention include vegetable fats and oils (e.g., soybean oil, palm oil, corn oil, rapeseed oil) and animal fats and oils (e.g., lard, tallow), or a fractionated oil thereof or a hardened oil thereof.

In a preferred embodiment of the present invention, the physical properties and palatability of the tofu-like food can be further improved by adjusting the pH of the mixture of soybean protein, water, soybean curd, and fats and oils. Since commercially available neutralized and isolated soybean protein has buffering capability, a mixture of such soybean protein and soybean curd usually having a pH of about 6.1 has a pH between 7.0 and 7.1. In the preferred embodiment, the pH of the mixture is decreased by addition of a pH-adjusting agent (usually acidifying agent) while controlling pH not to become 6.5 or lower. The optimum pH range of the mixture is from 6.6 to 6.8.

The acidifying agent to be added includes citric acid, bittern, calcium sulfate, and acid pyrophosphoric acid. If necessary, the acidifying agent may be used in combination with an alkalifying agent, e.g., sodium bicarbonate, sodium hydroxide, and sodium pyrophosphate. When, in particular, a sparingly water-soluble alkaline earth metal coagulant, e.g., calcium sulfate, is used as an acidifying agent, the mixture exhibits improved molding properties even with a relatively high water content.

If desired, the mixture may further contain seasoning agents, known additives for prevention of denaturation on freezing such as starch, dextrin, gum substances, wetting agents (e.g., sorbitol), and the like. After the mixture is homogenized, other ingredients such as finely cut pieces of vegetables may be incorporated into the mixture, if desired.

In the production of frozen tofu-like products, in order that fresh palatability and tofu-like brittleness or softness may be retained even after thawing, it is effective to disperse a hydrous gel of polysaccharides in the mixture.

The polysaccharides which can be used in the present invention include gel-forming polysaccharides, such as gellan gum, agar (preferably heat-resistant agar), carrageenan, alginic acid, low methoxyl pectin, etc., either individually or in combination of two or more thereof. Among them, a hydrous gel of gellan gum or alginic acid is superior in heat resistance to other polysaccharide hydrous gels and therefore makes it possible to subject the mixture to high-temperature sterilization such as retort sterilization prior to freezing. These gel-forming polysaccharides may be used in combination with gums, e.g., xanthene gum, locust bean gum, guar gum, tamarind seed gum, etc.

The polysaccharide gel itself may have a much higher water content that the mixture comprising the soybean curd, soybean protein, water, and fats and oils. The water content of the gel can be easily adjusted to 90% by weight or even higher.

The polysaccharide gel is added to the mixture in the form of pieces whose size (i.e., a maximum diameter or width) ranges from 1 to 15 mm, preferably from 1 to 10 mm, when frozen. The pieces of the gel are not particularly limited in shape and may be spheres or cubes. If the size of the gel pieces is too large, the polysaccharide gel outstrips the soybean curd in palatability, resulting in reduction of the tofu-like palatability. If it is too small, brittleness or softness would be lost, though a juicy touch may be obtained.

Incorporation of the polysaccharide hydrous gel into the mixture can be effected simply by mixing the gel pieces with the mixture to form a dispersion.

The polysaccharide hydrous gel can be prepared by dissolving the polysaccharide in water, followed by gelation by cooling or by addition of a gelling agent, e.g., cations. The gel pieces may be formed i) by cutting a hydrous gel into cubes of a prescribed size; ii) by dropwise adding a polysaccharide solution to a solution of a gelling agent to form beads of a desired size; or iii) by dropwise adding a gelling agent solution to a polysaccharide solution to form capsules of a desired size.

The hydrous gel is added to the mixture in an amount of from 2 to 30 parts by weight, preferably from 5 to 15 parts by weight, per 100 parts by weight of the mixture. If the proportion of the hydrous gel is too small, the expected effect cannot be attained. On the other hand, if it is too large, the resulting tofu-like food has an unfavorable tacky feel.

The hydrous gel of gellan gum can be prepared, for example, by suspending from 0.05 to 1.5% by weight, preferably from 0.1 to 1% by weight, of gellan gum in water, heating the suspension at a temperature of 90° C. or higher, adding a metallic ion (e.g., a calcium ion) as a gelling agent (e.g., in an amount of from about 0.005 to 1% by weight), cooling the suspension to solidify, and cutting the resulting gel into cubes, etc. of from about 1 to 15 mm in maximum size. The gum solution may be added dropwise to a solution of a metallic ion gelling agent to form beads, or the gelling agent solution may be added dropwise to the gum solution to form capsules.

The hydrous gel of agar can be prepared, for example, by suspending from 0.5 to 2% by weight of agar in water, heating the suspension to dissolve the agar, cooling the solution to solidify, and cutting the gel into cubes of from about 1 to 15 mm in maximum size. The agar solution may be added dropwise to cool water to form gel beads.

The hydrous gel of alginic acid can be prepared, for example, by dissolving from 0.2 to 2% by weight, preferably from 0.2 to 1% by weight, of an alginic acid salt (e.g., sodium alginate, potassium alginate) in water, adding a gelling agent (e.g., a calcium ion) to solidify the solution, and cutting the resulting gel into cubes of from 1 to 15 mm in maximum size. The alginate solution may be added dropwise to the gelling agent solution to form beads, or the gelling agent solution may be added dropwise to the alginate solution to form capsules.

The hydrous gel of low methoxyl pectin can be prepared in the same manner as described for the alginic acid hydrous gel.

The hydrous gel of carrageenan can be prepared, for example, by suspending from 0.5 to 3% by weight, preferably from 0.5 to 2% by weight, of carrageenan in water (usually kept at 70° C. or higher), adding a gelling agent (e.g., a calcium ion) to the solution to solidify, and cutting the resulting gel into cubes of from about 1 to 15 mm in maximum size. The carrageenan solution may be added dropwise to the gelling agent solution to form beads, or the gelling agent solution may be added dropwise to the carrageenan solution to form capsules.

The thus prepared mixture comprising the soybean curd, soybean protein, water, fats and oils, and if desired, a polysaccharide gel, is cast in a mold to a given thickness and then coagulated by heating. Heating can be carried out at a temperature of from about 70° to 110° C., preferably 75° to 90° C., for a period of from about 10 to 60 minutes.

If desired, the thus obtained tofu-like food is cut to size or subjected to freezing.

The tofu-like food produced by the process of this invention is less crumbly and releases water in a reduced amount with time when compared with conventional tofu products, while having satisfactory palatability and taste quite close to tofu. Therefore, the tofu-like food according to the present invention is suitable as a material for preparing tofu dishes in large quantities.

The present invention is now illustrated in greater detail by way of the following Examples, but it should be understood that the present invention is not deemed to be limited thereto. In these examples, all the parts and percents are by weight unless otherwise indicated.

EXAMPLE 1

A mixture of 500 parts of an isolated soybean protein powder ("New Fuji Pro-SE" produced by Fuji Oil Co., Ltd.), a varied amount of water, and 500 parts of soybean oil were mixed and emulsified in a Stephan cutter, and up to 3,000 parts of commercially available hard tofu, 125 parts of waxy corn starch, and a varied amount of citric acid or sodium bicarbonate as a pH adjusting agent were added thereto, followed by further mixing to obtain an emulsion. The emulsion was poured into a tray having a depth of 15 mm and then heated at 85° C. for 30 minutes. The thus coagulated gel was cut to pieces of 15 mm and then frozen at −40° C. to obtain frozen tofu-like food.

After preservation in a freezer at −40° C. for 7 days, the frozen product was thawed and subjected to organoleptic testing. The palatability was judged taking that of non-frozen tofu as a standard (10). The results obtained are shown in Table 1 below.

TABLE 1

| Run No. | Water* (part) | Hard Tofu (part) | Citric Acid (part) | Sodium Bi-carbonate (part) | pH | CP Ratio | Palatability | Remark |
|---|---|---|---|---|---|---|---|---|
| 1 | 3000 | 0 | 3 | 0 | 6.7 | 0 | 5.0 | Comparison |
| 2 | 2700 | 500 | 2.5 | 0 | 6.7 | 7.5 | 7.0 | Invention |
| 3 | 2400 | 1000 | 2.0 | 0 | 6.7 | 19.4 | 8.5 | " |
| 4 | 1800 | 2000 | 1.0 | 0 | 6.7 | 38.8 | 8.0 | " |
| 5 | 1200 | 3000 | 0 | 0 | 6.7 | 58.2 | 6.0 | " |
| 6 | 900 | 3500 | 0 | 1.0 | 6.7 | 67.8 | 4.5 | Comparison |

Note:
*The water content was determined so that the emulsions might have substantially the same softness in the mouth.

As is apparent from Table 1, palatability after thawing was excellent with the CP ratio ranging from about 10 to 40%. When the CP ratio was too low as in Ruh No. 1, the product lacked brittleness or crumbliness characteristic of tofu. When it was too high as in Run No. 6, the product was too crumbly to give satisfactory palatability. It was also proved that the good taste of the product increased accordingly as the CP ratio increased.

A tofu salad was prepared using the frozen tofu-like food of Run No. 3 according to the following formula. Thirty-five kilograms of the frozen tofu-like food was thawed by passing through hot water in a rotary kiln and then cooled in cold water. After draining water off, the tofu-like cubes were mixed with 30 kg of sliced cucumber, 7 kg of fine strips of thin plain omelette, and 3 kg of fine strips of carrot while agitating with a scoop in a rotary kiln, and a French dressing containing chopped leaf of beefsteak plant (sold by Riken Vitamin K.K.) was then mixed therewith to obtain a tofu salad for 1,000 servings.

For comparison, a tofu salad was prepared according to the same recipe as described above, except for using non-frozen cotton-stained tofu. In this case, crumbling of the tofu pieces took place the moment the ingredients were agitated in the rorary kiln. To the contrary, the pieces of the tofu-like food of the present invention suffered from no substantial crumbling.

For further comparison, the same recipe was followed, except for using non-frozen momen tofu and agitation of ingredients and mixing with the dressing were carried out in small batches with care. When the resulting tofu salad was left to stand for 1 hour, the water content was released from the tofu to make the dressing watery and unpalatable. To the contrary, the tofu-like food according to the present invention did not liberate water even when left to stand for 1 hour.

EXAMPLE 2

Frozen tofu-like food was prepared in the same manner as in Run No. 3 of Example 1, except for changing the amount of citric acid and the pH as shown in Table 2 below. The results of organoleptic testing are shown in Table 2.

TABLE 2

| Run No. | Citric Acid | pH | Palatability | Remark |
|---|---|---|---|---|
| 3 | 2 | 6.7 | 8.5 | Invention |
| 7 | 5.3 | 6.2 | 3.0 | Comparison |
| 8 | 4.0 | 6.4 | 3.5 | " |
| 9 | 2.7 | 6.6 | 8.5 | Invention |
| 10 | 0 | 7.0 | 7.5 | " |

As is apparent from Table 2, palatability of the tofu-like food can be improved by adding citric acid to the mixture containing no citric acid (pH=7.0, Run No. 10) to thereby lower the pH of the mixture. However, if the pH was decreased to 6.5 or lower, palatability was drastically impaired, indicating that the food had undergone denaturation due to freezing.

EXAMPLE 3

A mixture of 300 g of an isolated soybean protein powder ("New Fuji Pro-R" produced by Fuji Oil Co., Ltd.), 3,300 g of water, and 300 g of soybean oil was mixed and emulsified in a homomixer. The resulting emulsion was heated at 80° C. for 5 minutes under stirring. Then, 30 g of bittern (produced by Akoh Kasei K. K.) having been adjusted to 30 BX was added to 1 l of the heated emulsion to obtain tofu comprising isolated soybean protein.

Frozen tofu-like food was prepared in the same manner as in Run No. 3 of Example 1, except for using the above-prepared tofu in place of the commercially available hard tofu.

The resulting tofu-like food exhibited satisfactory palatability similarly to the product of Run No. 3 of Example 1.

EXAMPLE 4

A mixture comprising 500 g of an isolated soybean protein powder "New Fuji Pro-SE", 1,750 g of water, 500 g of soybean oil, and 1,000 g of hard tofu was mixed and emulsified in a Stephan cutter. To the resulting emulsion were added 50 g of Japanese sake, 5 g of HPP (Hydrolyzed Plant Protein), 10 g of sodium chloride, and 100 g of waxy corn starch, followed by mixing. Spinach cut to appropriate size, carrot cut into 5 mm cubes, and corn grains were then added to the mixture each in an amount of 200 g. The mixture was poured into molds of 60 mm wide, 60 mm long, and 20 mm deep and steamed at 80° C. for 40 minutes to solidify. After cooling, the resulting gel was frozen at −40° C. to obtain frozen tofu-like food containing vegetables.

After thawing, when the tofu-like food was cut to arbitrary sizes and used as a material for a wide variety of dishes, such as roast tofu, Japanese style tofu stew, Chinese style fried dishes, and the like, it had satisfactory palatability and taste.

EXAMPLE 5

Preparation of Mixture

A mixture comprising 500 parts of an isolated soybean protein powder "New Fuji Pro-SE", 2,400 parts of water, and 500 parts of soybean oil was mixed in a Stephan cutter, and 1,000 parts of commercially available hard tofu, 125 parts of waxy corn starch, and 2.0 parts of citric acid were added thereto to obtain a mixture having a pH of 6.7.

Preparation of Hydrous Gel (1) A gellan gum ("Kelco Gum" produced by San-ei Kagaku K.K.) was dissolved in hot water while stirring to prepare a 0.3% solution. Calcium chloride dissolved in a small amount of water was then added thereto to a concentration of 0.03%. After cooling to solidify, the resulting hydrous gel was cut into cubes having a size of 3 mm.

(2) K-Carrageenan ("Carragheenin CS47" produced by San-ei Kagaku K.K.) was dissolved in water under heating to prepare a 1.5% solution. After cooling to solidify, the resulting hydrous gel was cut into cubes having a size of 3 mm.

(3) Agar ("Ina Kanten M-7" produced by Ina Shokuhin Kogyo K.K.) was dissolved in water under heating to prepare a 1% solution. After cooling to solidify, the resulting agar hydrous gel was cut into cubes having size of 3 mm.

(4) Sodium alginate was dissolved in water to prepare a 0.5% aqueous solution, and the solution was added dropwise to a 2% aqueous solution of calcium lactate to obtain capsules having a diameter of 5 mm.

Preparation of Frozen Food

Ten parts each of the above-prepared hydrous gels were added to 100 parts of the above-prepared soybean protein mixture and dispersed therein taking care not to destroy the gel pieces. The dispersion was poured into trays having a depth of 15 mm, heated at 85° C. for 30 minutes, and, after cooling, cut into cubes having a size of 15 mm, followed by freezing at −40° C. to obtain frozen tofu-like food.

After preserving in a freezer for 1 week, the tofu-like food was thawed and served for eating. The water released from the hydrous gel on thawing made the food juicy, brittle and soft and imparted roughness and fineness to the tissue. In particular, when compared with a product prepared in the same manner as described above but using no hydrous gel of a polysaccharide, it was confirmed that the tofu-like food containing the hydrous gel according to the present invention had improved brittleness or softness like ordinary tofu (called "momen tofu" in Japan).

As described above, since the tofu-like foods according to the present invention can be prevented from releasing water and have excellent shape-retention properties, they are suitable for preparing tofu dishes in large quantities. In addition, the tofu-like foods of the invention possess a satisfactory taste and excellent palatability. In particular, when the process of the present invention is applied to production of frozen tofu-like food, the product after thawing has palatability closer to conventional non-frozen tofu. Accordingly, the suitability to cooking in large quantities combined with the possibility of selling or distributing on the market in a frozen state make a great contribution to further improvements of the food situation.

While the invention has been described in detail and with reference to specific embodiments thereof, it will be apparent to one skilled in the art that various changes and modifications can be made therein without departing from the spirit and scope thereof.

What is claimed is:

1. A process for producing tofu-like food which comprises preparing a mixture containing soybean curd, soybean protein, water, and fats and oils and coagulating the mixture by heating, wherein the ratio of crude protein content in the soybean curd to crude protein content in the soybean protein ranges from 0.05 to 1 by weight, wherein said mixture has a pH of from 6.5 to 7.1 and wherein said soybean protein is isolated soybean protein, wherein said heating is a temperature from about 70° to 110° for a period of from about 10 to 60 minutes and wherein the water content of the mixture before coagulation, ranges from 65 to 80% by weight.

2. A process as claimed in claim 1, wherein said mixture has dispersed therein pieces of a hydrous gel of a poysaccharide.

3. A process as claimed in claim 2, wherein said polysaccharide is selected from gellan gum, agar, carrageenan, alginic acid, and low methoxyl pectin.

4. A process as claimed in claim 2, wherein said hydrous gel is present in the mixture in an amount of from 2 to 30% by weight.

5. A process as claimed in claim 1, wherein the fats and oils are present in an amount of from about 0.5 to 3 times the weight of the soybean protein.

6. A process as claimed in claim 1, wherein the soybean curd is silken tofu, ordinary tofu, hard tofu or soybean curd obtained by adding a coagulant to a homogenized mixture of isolated soybean protein, fats and oils, and water.

7. A process as claimed in claim 1, wherein said soybean curd is obtained by adding a coagulant to a homogenized mixture of isolated soybean protein, fats and oils, and water.

8. A process as claimed in claim 5, wherein the ratio of crude protein content in the soybean curd to curd protein content in the soybean protein ranges from 10 to 40% by weight.

9. A process as claimed in claim 5, wherein the soybean protein has not undergone heating in the presence of a coagulant.

* * * * *